United States Patent [19]

Hehl

[11] Patent Number: 4,730,937
[45] Date of Patent: Mar. 15, 1988

[54] PLASTICIZING UNIT FOR AN INJECTION MOLDING MACHINE

[76] Inventor: Karl Hehl, Arthur-Hehl-Strasse 32, D-7298 Lossburg 1, Fed. Rep. of Germany

[21] Appl. No.: 883,745

[22] Filed: Jul. 9, 1986

[30] Foreign Application Priority Data

Dec. 31, 1985 [DE] Fed. Rep. of Germany ....... 3546415

[51] Int. Cl.$^4$ ............................. B29F 1/00; B29F 1/06
[52] U.S. Cl. .................................... 366/146; 366/79; 366/149; 425/208; 425/209
[58] Field of Search ............................... 366/144–146, 366/149, 79, 318; 425/192 R, 143, 144, 208, 209; 219/388, 421; 165/86, 87, 109.1

[56] References Cited

U.S. PATENT DOCUMENTS

| 4,262,737 | 4/1981 | Faillace ........................... 425/144 X |
| 4,479,048 | 10/1984 | Kinoshita .......................... 219/388 |

FOREIGN PATENT DOCUMENTS

| 69221 | 9/1984 | European Pat. Off. . |
| 7345326 | 9/1975 | Fed. Rep. of Germany . |
| 3229223 | 4/1983 | Fed. Rep. of Germany . |

OTHER PUBLICATIONS

Brochure by Erge Elektrowärme–Technik Franz Messer (3 sheets).
Brochure by Ihne & Tesch (2 sheets).
Brochure by Eltra GmbH & Co. KG Leicht & Trambauer Elektrowärmetechnik (3 sheets).
Brochure by Türk & Hillinger GmbH Elektrowärme, pp. 1–4, 6.

Primary Examiner—Timothy F. Simone
Attorney, Agent, or Firm—Spencer & Frank

[57] ABSTRACT

A plasticizing unit for an injection molding machine includes a plasticizing cylinder; a plurality of separately energizable resistance heaters arranged on the plasticizing cylinder; clamping sleeves surrounding the resistance heaters and oriented generally coaxially with the plasticizing cylinder; and clamping elements tightening the clamping sleeves for pressing the resistance heaters against the outer face of the plasticizing cylinder. There is provided a protective casing surrounding the plasticizing cylinder and being attached thereto. Each resistance heater comprises a flat-tube heater body including consecutive first and second length portions. The first length portion contains heating wires and has a helical course about the outer face of the plasticizing cylinder. The second length portion forms an end of the flat-tube heater body and is free from heating wires and contains the lead wires. The second length portion is bent out of the helical course of the first length portion and is accommodate in a space defined between the outer face of said plasticizing cylinder and the protective casing. A terminal panel is secured to a rear terminus of the protective casing and is oriented generally perpendicularly to the longitudinal axis of the plasticizing cylinder. Supply cables within the protective casing are connected to the end portions of the heater bodies and to terminal plugs which are supported in the terminal panel for displacements of limited extent in a direction parallel to the longitudinal axis of the plasticizing cylinder.

12 Claims, 10 Drawing Figures

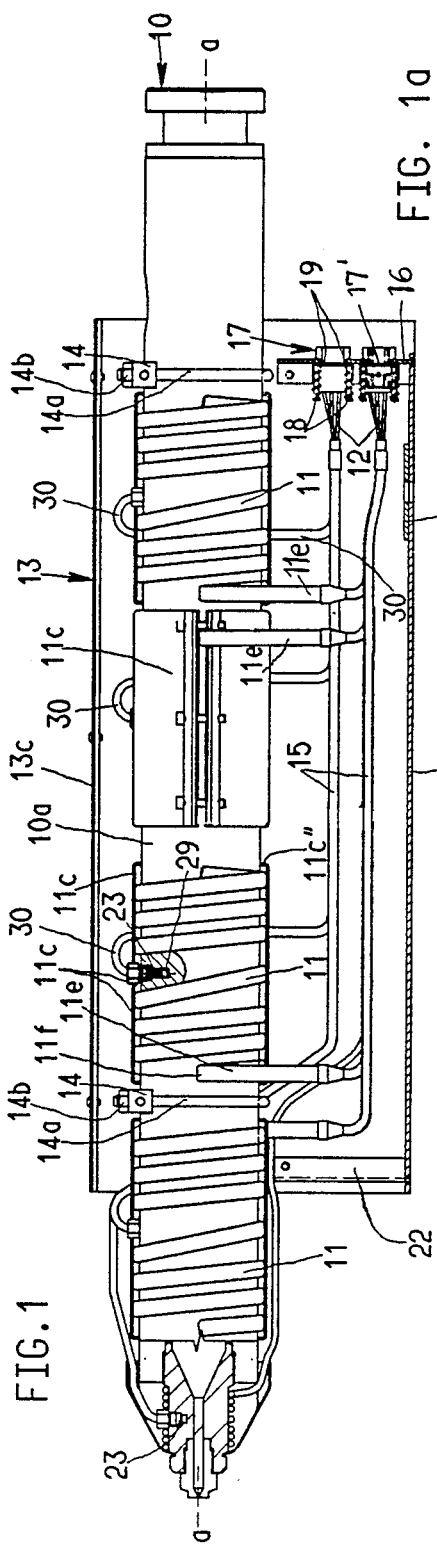
FIG. 1
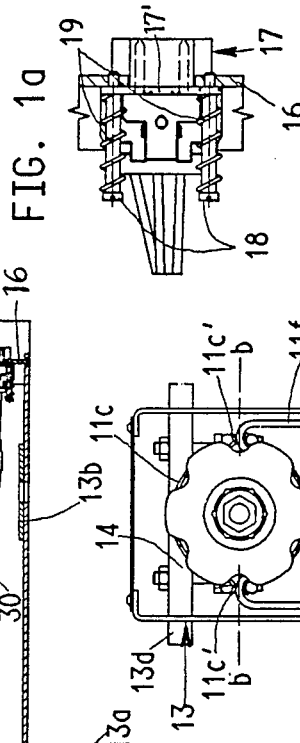
FIG. 1a
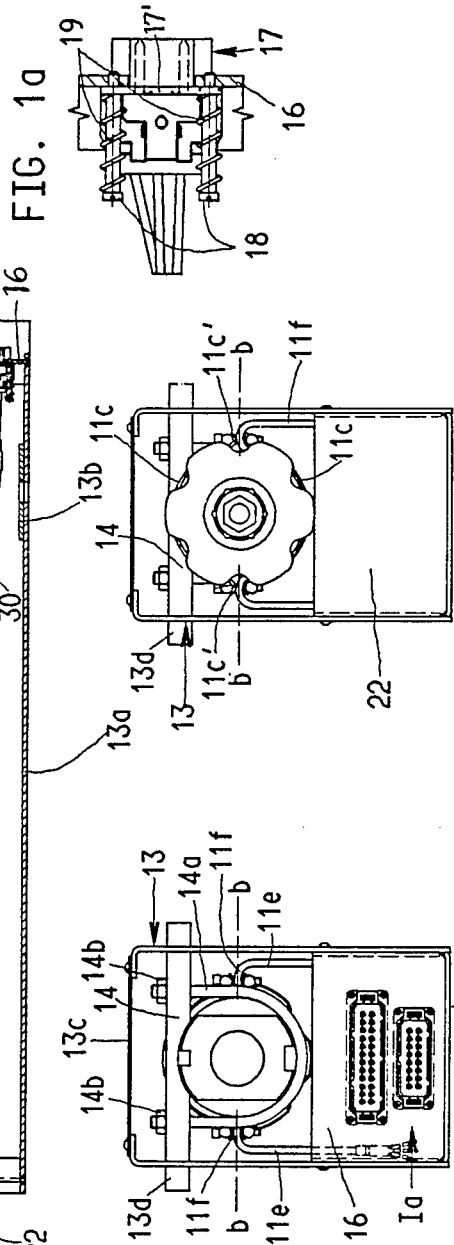
FIG. 2
FIG. 3

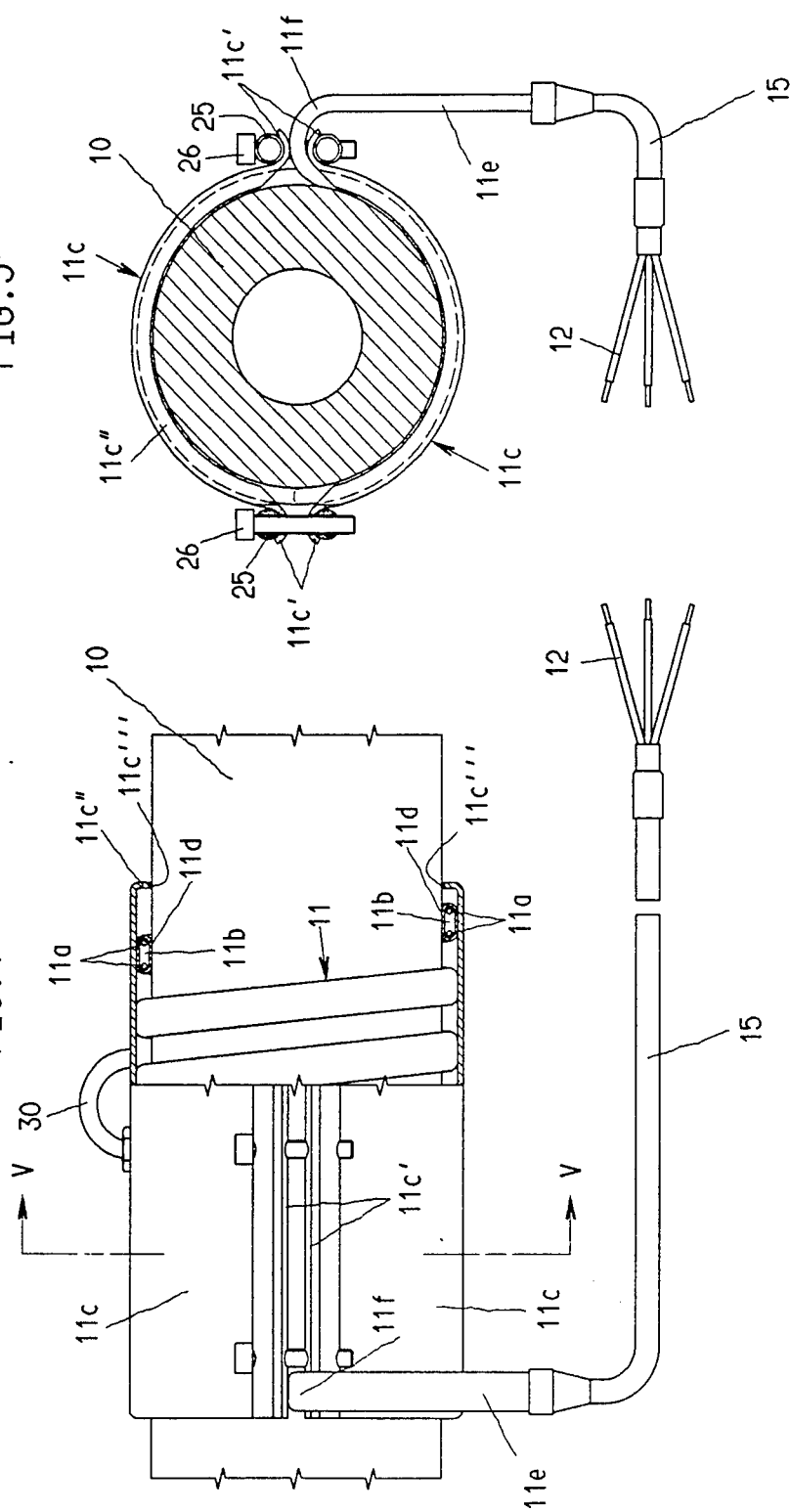

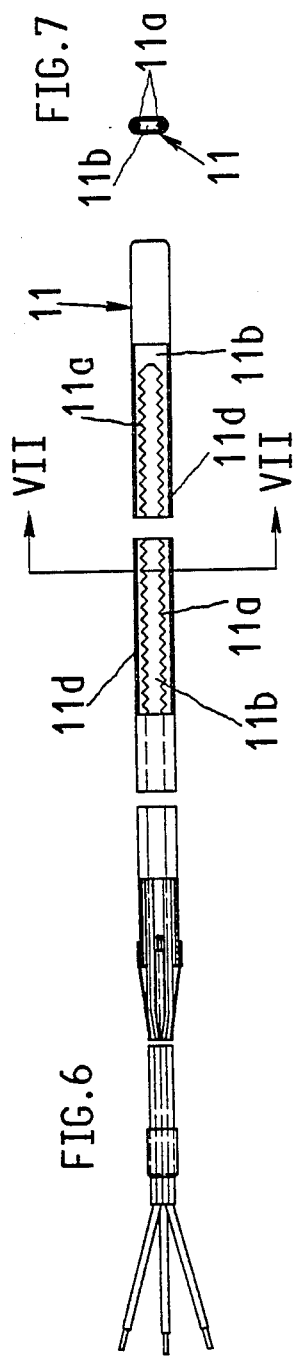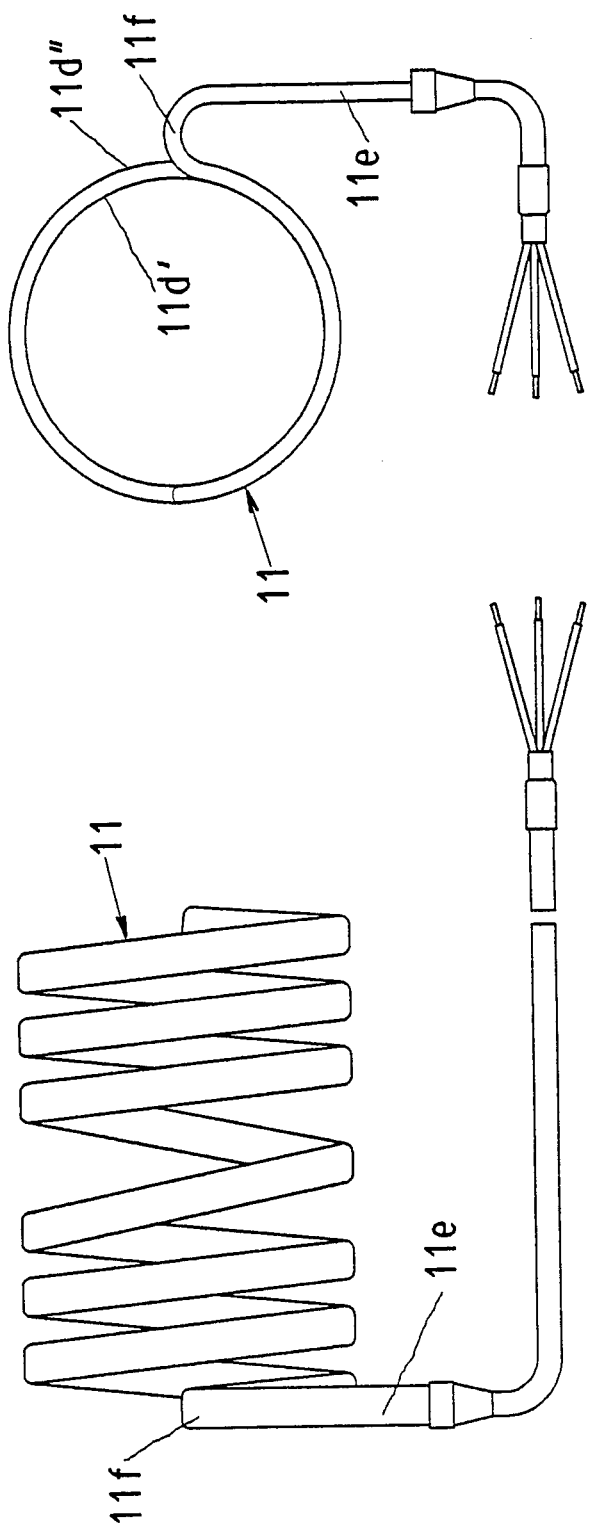

PLASTICIZING UNIT FOR AN INJECTION MOLDING MACHINE

BACKGROUND OF THE INVENTION

This invention relates to an injection molding machine for processing synthetic materials and is of the type which includes an injection molding unit equipped with a changing device for replacing a plasticizing unit forming part of the injection molding unit.

The plasticizing unit—to which the invention is more particularly directed—includes a plasticizing cylinder which has a plurality of independently controllable resistance heaters whose heating wires are supported by ceramic insulating bodies. The resistance heaters are clamped on the outer cylindrical face of the plasticizing cylinder by means of axially split tightening sleeves pressed together by tangentially clamping tightening elements. The plasticizing unit further has handle components for being grasped by conveying means which move the plasticizing unit for effecting replacement. There is further provided a stand on which the plasticizing unit may be set in a stable equilibrium after being separated from the injection molding unit.

A known, automatically replaceable plasticizing unit of the above-outlined type equipped with the usual ceramic heater bodies includes a coupling block which is fixedly connected with the plasticizing cylinder and which includes the plastic material supply channel. The coupling block serves, among others, as the stand for the uncoupled plasticizing unit, as disclosed in European Patent No. 69,221 and German Offenlegungsschrift (non-examined published application) No. 3,229,223. The ceramic heater bodies are of the type disclosed in related brochures by the firms Erge Elektrowärme-technik Franz Messer, D-8563 Schnaltach, Hersbruckerstrasse 31 and Ihne & Tesch, D-5880 Lüdenscheid, Am Drostenstück 18, both of the Federal Republic of Germany.

Further, flat-tube heating bodies are known which find application mostly in industrial electric heating and apparatus construction for heating air and liquid and which are also adapted to perform contact heating. The initially linear flat-tube heater bodies are formed of a cross-sectionally flat tube of chromium nickel steel and heating wires which are embedded within the flat tube in a highly densified magnesium oxide or magnesium silicate material. Such flat-tube heater bodies which are flexible to allow easy bending thereof for adapting them to the specific configurational requirements, may be of the type disclosed in related brochures by the firms Eltra GmbH and Co. KG Leicht & Trambauer Elektrowärmetechnik, P.O.B. 1120, D-6102 Pfungstadt as well as Türk & Hillinger GmbH Elektrowärme, D-7200 Tuttlingen, Friedrichstrasse 21, both of the Federal Republic of Germany. Although such flat-tube heaters have been known and widely used in a great number of environments for decades, including the heating of injection nozzles in injection molding machines (as disclosed in German Utility Model No. 7,345,326), they could not be used in plasticizing cylinders of injection molding machines, one reason having been the problem of protecting the heater wire-free end portions of the heater coils and the connected supply conduits of the plasticizing cylinder against mechanical shocks and impacts externally of the heated zone. Such problems are not encountered in the heating of the less exposed injection nozzles, since their diameter is less than that of the associated plasticizing cylinders.

SUMMARY OF THE INVENTION

It is an object of the invention to provide an improved plasticizing unit of the above-outlined type in which the handling of the plasticizing unit during replacement is facilitated while maintaining a superior energy efficiency and effecting a rapid temperature regulation.

This object and others to become apparent as the specification progresses, are accomplished by the invention, according to which, briefly stated, as resistance heaters for the plasticizing cylinder flat-tube resistance heater bodies—for example, of the type identified earlier—are used which are bent to form heater coils and which are exposed to the centripetal pressure of the clamping sleeves surrounding the plasticizing cylinder. Further, end portions of the flat-tube heater bodies which are free from heating wires, but which include electric lead wires, are bent out of the helical course of the heater coils and are shrouded by a protective member spaced from the clamping sleeves. The protective member which, according to a preferred embodiment, is a cross-sectionally U-shaped casing, also serves as a stand for supporting the plasticizing cylinder when removed from the injection molding unit. A terminal panel is secured to a rear terminus of the protective casing and is oriented generally perpendicularly to the longitudinal axis of the plasticizing cylinder. Supply cables within the protective casing are connected to the end portions of the heater bodies and to terminal plugs which are supported in the terminal panel for displacements of limited extent in a direction parallel to the longitudinal axis of the plasticizing cylinder.

For several reasons, a plasticizing unit structured according to the invention as outlined above may be handled easier during the exchange operation, while using a type of rapidly regulating resistance heater which could not be used in plasticizing cylinders heretofore and which is able to generate very high plasticizing temperatures. Thus, one reason being that the directly connectable plasticizing cylinder is freed from the coupling block which results in a significant weight reduction of the replaceable unit. Further, the protective member for the supply terminals may simultaneously serve, by virtue of its particular configuration, as a stand for the plasticizing cylinder after its release from the plasticizing unit, and also function as a holding arrangement engageable by the conveying device which executes the exchange of the plasticizing unit.

The protective member thus protects a space where the bent-out end portions of the heater coils free-floatingly hold the cable carrying the lead wires for the heating wires of the heater coils. It is an advantage of this arrangement that the cables may, with the flexible lead wires, follow the temperature-caused expansions and contractions of the heater coils without resistance.

The use of flat-tube heater bodies favors a rational mass production because the flat-tube heater bodies may be wound into coils of different inner diameters without appreciable additional technological input to adapt them to plasticizing cylinders of different diameters.

BRIEF DESCRIPTION OF THE DRAWING

FIG. 1 is a side elevational view, partially in section, of a plasticizing unit incorporating a preferred embodiment of the invention.

FIG. 1a is an enlarged detail of FIG. 1.

FIG. 2 is a rear elevational view of the structure shown in FIG. 1.

FIG. 3 is a front elevational view of the structure shown in FIG. 1.

FIG. 4 is a fragmentary elevational view, partially in section, of a detail of FIG. 1, illustrated on an enlarged scale.

FIG. 5 is a sectional view taken along line V—V of FIG. 4.

FIG. 6 is a longitudinal sectional view of a heater body used in the preferred embodiment, shown prior to shaping it into a coil.

FIG. 7 is a sectional view taken along line VII—VII of FIG. 6.

FIG. 8 is a side elevational view of a coiled heater body forming part of the preferred embodiment.

FIG. 9 is a front elevational view of the construction shown in FIG. 8.

DESCRIPTION OF THE PREFERRED EMBODIMENT

Turning now to FIG. 1, the plasticizing unit shown therein is designed for an injection molding machine which has an injection molding unit equipped with an exchanging device for replacing the plasticizing unit.

The plasticizing cylinder 10 of the plasticizing unit is provided with a plurality of independently controllable resistance heaters. The resistance heaters are flat-tube heater bodies bent to form heater coils 11 which are held on the outer face 10a of the plasticizing cylinder 10 by clamping sleeves exerting a centripetal pressure thereon. Each clamping sleeve is axially split and is thus constituted by a pair of identical shells 11c which are tightened to the cylindrical surface 10a of the plasticizing cylinder 10 by diametrically oppositely arranged and tangentially acting clamping bolts 26. For this purpose, as particularly well seen in FIGS. 5, each shell 11c has opposite longitudinal edges 11c' which, as viewed in cross section, are curved in a direction which is opposite to the direction of shell curvature. The edges 11c' belonging to different shells 11c thus form pair-wise back-to-back oriented, coextensive trough-like structures. Each trough-like longitudinal edge 11c' receives a cylindrical support pin 25 of corresponding radius. The pins 25 are traversed by and are threadedly in engagement with the clamping bolts 26. Heater wire-free end portions 11e of the heater coils 11 are, together with supply cables 15 containing lead wires 12 bent out of the curved course of the heater coil 11 and are screened by a U-shaped casing 13 which extends along a substantial length portion of the plasticizing cylinder 10 and which is spaced from the clamping shells 11c. The underside 13a of the casing 13 serves as a setting face on which the plasticizing unit may rest in a stable equilibrium after it has been disconnected from the injection molding unit.

With particular reference to FIGS. 1 and 2, the plasticizing cylinder 10 is connected to the casing 13 by means of horizontal webs 14 which are held in the vertical walls of the casing 13. U-shaped clamping yokes 14a cradle the plasticizing cylinder 10 and are held in the horizontal webs 14 by nuts 14b threaded on the ends of the yoke legs.

With particular reference to FIGS. 2, 3, 8 and 9, the end portions 11e of the heater bodies (coils) 11 have a vertical orientation and are connected to the coiled part of the respective body 11 by a curved connecting portion 11f which has a course—from a horizontal plane b—b containing the cylinder axis a—a—that is directed oppositely to the course of the heater coils 11. The lead wires 12 are held in the cable 15 which is supported at the end of the terminal portion 11e in a freely floating manner. As a result, each end portion 11e and the cable 15 are capable of following without resistance the heat-caused expansions or contractions of the heating coils 11, while being situated in a space protected by the casing 13. As seen in FIGS. 1 and 3, the protected space is closed at the front by a vertical panel 22 secured to the casing 13.

The U-shaped casing 13 is, by means of a top plate 13c, complemented into an axially extending tube of rectangular cross section which projects laterally to both sides of the center of gravity of the plasticizing unit. The supply cables 15 of the heater coils 11 extend within the rectangular tube to a vertical terminal panel 16 held at the rearward end of the plasticizing cylinder 10. Also referring to FIG. 1a, the plug terminals 17 of the supply cables 15 are axially displaceably supported for limited shifting motions on horizontal support pins 18 of the terminal panel 16 by means of centering shoulders 17'. The pins 18, fastened on the terminal panel 16, penetrate the centering shoulders 17'. A coil spring 19 surrounds each pin 18 and abuts on the one side on the shoulder 17' and on the other side on a head of the surrounded pin 18. Therefore centering shoulder 17' of the plug terminals 17 are pressed against the terminal panel 16. This arrangement ensures that jars and shocks, particularly the rhythmic axial shocks imparted on the plasticizing unit in the course of the periodic injection of the plastic material into the injection mold assembly have, even in the long run, no harmful effect on the contact terminals of the supply cables 15.

To the vertical walls of the casing 13 radially symmetrical pins 13d are secured which serve as holding members for engagement by the conveying mechanism for the plasticizing unit.

As seen particularly in FIG. 1, in each separate heating coil 11 the respective electric lead wires 12 are arranged only at one axial end thereof and extend in the heater wire-free end portion 11e of the respective heater coil 11. The heater coils 11 are arranged pairwise on the plasticizing cylinder 10 in a mirror image to one another in such a manner that the end portions 11e of adjacent heater coils 11 forming one pair are oriented towards one another. By virtue of this arrangement the terminal portions 11e of adjoining heater coils 11 may be bent out from their respective heater coils 11 at a common axial length portion of the plasticizing cylinder 10 which is not occupied by the clamping shells 11c. In this manner, the end portions 11e are arranged in pairs for attachment to the associated supply cable 15.

With particular reference to FIGS. 5–8, the flat outer tube forming each heater coil 11 is of a chromium-nickel steel and is filled with a powdery ceramic mass, preferably magnesium oxide or magnesium silicate in which the spirally wound heater wire 11a is embedded. As may be observed particularly in FIGS. 1, 4 and 5, the inner diameter of the heater coil 11 corresponds to the outer diameter of the plasticizing cylinder 10. The wall of the bilaterally symmetrical flat tube 11d of each heater coil 11 is deformed by planar pressing such that its side oriented towards the axis a—a of the plasticizing cylinder 10 constitutes a contacting wide side 11d' which constitutes approximately one-third of the entire outer surface of the flat tube. The contacting wide side 11d' is pressed against the outer face 10a of the plasticizing cylinder 10 by the centripetal pressure exerted by the clamping shells 11c. The inner cylindrical face of the clamping shells 11c lies against the outer flattened side 11d'' of the flat tube 11d which extends parallel to the contacting wide side 11d'. As seen in FIG. 4, the peripheral end portions 11c'' of the longitudinal ends of the clamping shells 11c are radially inwardly bent toward the surface of the plasticizing cylinder 10 and extend, with their terminal edges 11c''', at a uniform distance therefrom. As it may be particularly well seen in FIGS. 1 and 8, each heater coil has, in its mid portion, a greater pitch than at the flanking ends. In the axial section of the winding of greater pitch the plasticizing cylinder 10 has a radial bore 23 for receiving a heat sensor 29 whose conductor 30 joins the respective cables 15.

By virtue of the relatively large contact faces of the heater coils 11, formed by the wide sides 11d', there is achieved an improved heat conduction and, accordingly, a rapid heat regulation by the heater coils 11 can be achieved with relatively small energy losses.

The present disclosure relates to subject matter contained in Federal Republic of Germany Patent Application No. P 35 46 415.1 (filed Dec. 31, 1985) which is incorporated herein by reference.

It will be understood that the above description of the present invention is susceptible to various modifications, changes and adaptations, and the same are intended to be comprehended within the meanings and range of equivalents of the appended claims.

What is claimed is:

1. In a plasticizing unit for an injection molding machine, including a plasticizing cylinder having an outer face, a length and a longitudinal axis; a plurality of separately energizable resistance heaters arranged on said outer face along said length; each said resistance heater including heating wires and lead wires connected thereto and a supply cable containing said lead wires; clamping sleeves surrounding said resistance heaters and being oriented generally coaxially with said plasticizing cylinder, clamping elements tightening said clamping sleeves for pressing said resistance heaters against said outer face; and a support means carried by said plasticizing cylinder for stably supporting said plasticizing unit; the improvement comprising a protective casing at least partially surrounding said plasticizing cylinder along at least one part of the length thereof; said protective casing being spaced from said clamping sleeves; said protective casing including said support means; mounting means attaching said protective casing to said plasticizing cylinder; further wherein each said resistance heater comprises a flat-tube heater body including consecutive first and second length portions; said first length portion containing said heating wires and having a helical course about said outer face of said plasticizing cylinder; said second length portion forming an end of said flat-tube heater body; said second length portion being free from heating wires and containing said lead wires; said second length portion being bent out of said helical course and being accommodated in a space defined between said outer face of said plasticizing cylinder and said protective casing; the improvement further comprising a terminal panel secured to a rear terminus of said protective casing and being oriented generally perpendicularly to said longitudinal axis of said plasticizing cylinder; each supply cable being accommodated in said space; terminal plugs attached to said supply cables; and means supporting said plugs in said terminal panel for displacements of limited extent in a direction parallel to said longitudinal axis.

2. A plasticizing unit as defined in claim 1, said second length portion of each said flat-tube heater body having an initial arcuate part adjoining said first length portion and having a course oriented oppositely to said helical course of the first length portion; said initial arcuate part curving downwardly from a horizontal plane containing said axis; said second length portion having a downwardly extending additional part adjoining said initial arcuate part.

3. A plasticizing unit as defined in claim 1, wherein each said clamping sleeve is formed of two clamping shells arranged diametrically on said plasticizing cylinder.

4. A plasticizing unit as defined in claim 1, wherein said flat-tube bodies are arranged on said plasticizing cylinder in mirror symmetry to form pairs; each said body having a single said second end portion with associated lead wires at one axial end of said body; the second end portions of two bodies forming one pair being oriented toward one another.

5. A plasticizing unit as defined in claim 1, wherein each said flat-tube heater body has, along said first length portion, an outer surface, including a wide contacting face being in contact with said outer face of said plasticizing cylinder the area of said wide contracting face being approximately one third of said outer surface of said first length portion.

6. A plasticizing unit as defined in claim 1, wherein said first length portion has a center part and two flanking parts; said helical course having a pitch which is greater at said center part than at said flanking parts; said plasticizing cylinder having a radial bore in a zone of said center part of the first length portions of said flat-tube heater bodes; further comprising a heat sensor received in a respective said radial bore.

7. A plasticizing unit as defined in claim 1, wherein said protective casing has parallel-spaced side walls and a base wall connecting the side walls; said base wall having an outer face constituting said support means. said protective casing being provided with holding means projecting from outer faces thereof.

8. A plasticizing unit as defined in claim 7, wherein said mounting means comprises a web spaced generally parallel to said base and extending generally tangentially to said plasticizing cylinder between said side walls; said web having opposite ends being affixed to respective said side walls of said protective casing; said mounting means further having a U-shaped yoke surrounding said plasticizing cylinder and being secured to said web.

9. A plasticizing unit as defined in claim 7, further comprising an upper cover plate connecting said side walls of said protective casing and extending generally parallel to the base thereof; said protective casing being an elongated tube of rectangular cross section extending axially to approximately equal distances bilaterally from a center to gravity of said plasticizing cylinder; said protective casing being provided with holding means projecting from outer faces thereof.

10. A plasticizing unit as defined in claim 9, wherein said means for supporting said plugs includes horizontally extending support pins for longitudinally slidably supporting respective said terminal plugs; further comprising biased coil springs mounted on said support pins for urging said terminal plugs against centering shoulders mounted on said terminal panel.

11. A plasticizing unit as defined in claim 9, wherein said holding means comprise axially aligned pins secured to and extending outwardly from said side walls in an orientation perpendicular thereto.

12. A plasticizing unit as defined in claim 1, wherein said downwardly extending additional part and the supply cable connected thereto are in an unsupported, freely floating state.

* * * * *